United States Patent [19]
Binding

[11] 3,847,376
[45] Nov. 12, 1974

[54] PORTABLE VEHICLE RACK

[75] Inventor: Kenneth W. Binding, Woburn, Mass.

[73] Assignee: Beatrice Foods Co., Chicago, Ill.

[22] Filed: Sept. 22, 1972

[21] Appl. No.: 291,265

[52] U.S. Cl.......................... 254/88, 340/61, 116/98
[51] Int. Cl............................ E02c 3/00, G08b 7/00
[58] Field of Search ................. 254/88, 1; 298/352; 340/61; 187/8.47, 8.77; 116/98, 132

[56] References Cited
UNITED STATES PATENTS

| | | | |
|---|---|---|---|
| 1,538,437 | 5/1925 | Larsen | 254/88 |
| 1,650,536 | 11/1927 | Pier | 254/88 |
| 1,772,590 | 8/1930 | Adams | 254/88 |
| 2,623,491 | 12/1952 | Andrews | 254/1 |
| 2,784,692 | 3/1957 | Ballesteros | 116/132 R |
| 2,924,427 | 2/1960 | Larson | 254/88 |
| 2,979,694 | 4/1961 | Lamberti | 340/61 |
| 3,606,253 | 9/1971 | Wooten | 254/88 |
| 3,638,910 | 2/1972 | Nellis | 254/88 |

FOREIGN PATENTS OR APPLICATIONS
428,714  6/1911  France ..................... 254/88

Primary Examiner—Al Lawrence Smith
Assistant Examiner—Robert C. Watson
Attorney, Agent, or Firm—Robert T. Gammons; Dike, Bronstein, Roberts, Cushman & Pfund

[57] ABSTRACT

A portable vehicle rack having a horizontal rack plate reinforced along its longitudinal edges and supported at its four corners by legs fixed at their upper ends to the lower side of the rack plate, a detachably connected ramp plate connected at one end to one end of the rack plate, linking bars connecting the other end of the ramp plate to the lower ends of the legs at the one end of the rack plate, a signal device for indicating that the vehicle wheel has moved from the ramp plate onto the rack plate, and a traction device arranged to prevent the rack from moving away from the wheels of a vehicle moving into engagement with the lower end of the ramp plate.

9 Claims, 9 Drawing Figures

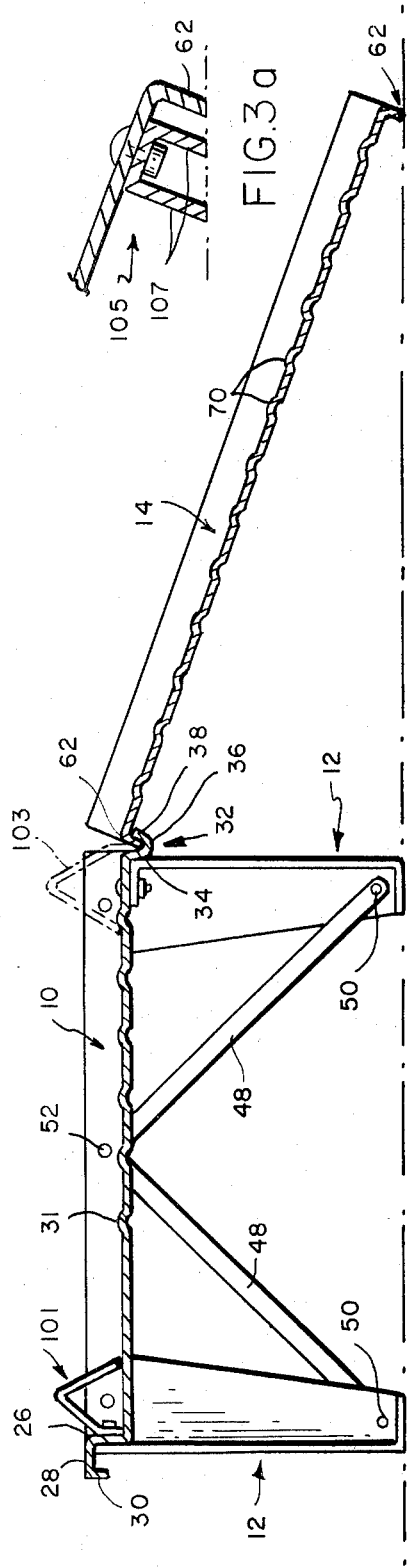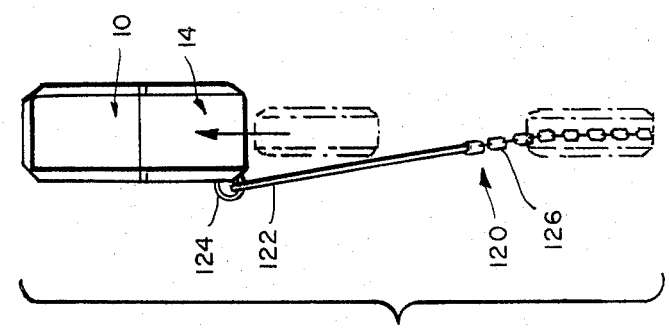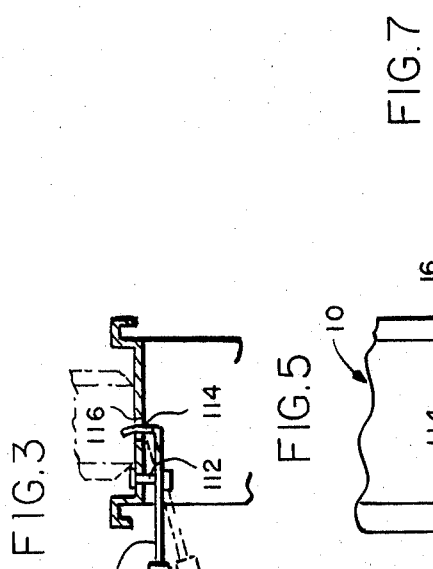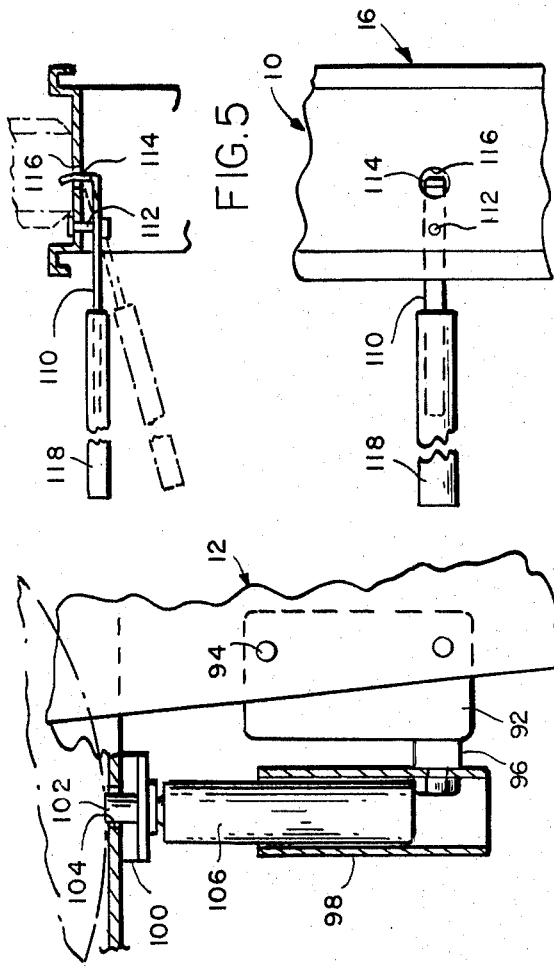

PORTABLE VEHICLE RACK

BACKGROUND OF THE INVENTION

Portable vehicle racks have been employed heretofore for the purpose of raising one or both ends of a motor vehicle from a floor to a sufficient height to enable a mechanic or other person to have access to the underside of the car for purposes of repair or inspection without need for a hydraulic lift and with safety which would not be insured by the use of lift jacks which may slip. A portable vehicle rack of this kind is shown in Wooten, U.S. Pat. No. 3,606,523, manufactured by the Kar Rite Corporation of Rosemont, Illinois and such patents as Dubroca, U.S. Pat. No. 1,855,949, Davis, U.S. Pat. No. 1,879,123, Larson, U.S. Pat. No. 2,924,427 and Lindal, U.S. Pat. No. 3,102,714. The portable vehicle rack of this invention embodies one or more of the structural features of the aforesaid patents combined, however, in an improved fashion such as to provide for greater safety in use, improved strength and resistance to failure, better traction to resist displacement as a vehicle wheel moves onto the ramp, means for indicating the presence of the wheel on the rack plate and simpler and more economical structure.

SUMMARY

The portable vehicle rack, as herein illustrated, comprises a horizontally disposed rack plate, spaced parallel, longitudinally disposed, integrally formed, upwardly extending stiffening members comprising guides along the opposite longitudinal edges of the rack plate, and transversely disposed, integrally formed stiffening members at the ends, one of which extends upwardly and is a stop and the other of which extends downwardly and is a coupling, four leg members disposed at the four respective corners of the rack plate perpendicular thereto, each leg member being of right angular cross-section, means rigidly fixing the upper ends of each leg member to the rack plate, means connecting the lower ends of each pair of longitudinally spaced legs to the rack plate midway between its ends, comprising diagonal brace bars at each longitudinal edge connected at one end to the lower ends of the respective legs and at their opposite ends to the rack plate midway between its ends, an inclined ramp plate, spaced parallel, longitudinally disposed, integrally formed, upwardly extending stiffening members comprising guides along the opposite longitudinal edges of the ramp plate, and transversely disposed, integrally formed stiffening members at the ends which extend downwardly therefrom and comprise, respectively, a coupling member and a traction member, the coupling member at the end of the rack plate comprising a U-shaped upwardly facing gutter and the coupling member at the one end of the ramp plate comprising a downwardly extending flange, said ramp plate being adapted to be disposed in an inclined position with the flange at its one end engaged within the gutter at the one end of the rack plate and with the other end resting on the ground, and linking members for connecting said other end of the ramp plate to the legs, comprising bars pivotally connected at one end to said other end of the ramp plate, notches at the other ends of the bars and lugs fixed to the lower ends of the legs with which the notched ends of the bars are adapted to be engaged. The rack plate contains a plurality of spaced parallel, transversely extending, upwardly displaced ribs distributed in spaced relation longitudinally thereof and similarly the ramp plate has longitudinally distributed, spaced parallel, upwardly displaced ribs. The legs at one end of the rack plate abut the undersides of the guides and the stop and the legs at the other end abut the undersides of the guides and the rack plate and are secured thereto. Webs join the lower edges of the lower ends of the sides and ends of the respective legs to each other. The brace bars extend upwardly from the lower ends of the legs and meet at the midpoint of the longitudinal edges of the rack plate and articulated links are connected at one end to the linking bars and at their other ends to the upper ends of the ramp plate. An indicator is mounted on the rack plate adjacent the upper end of the ramp plate operable, by movement of a vehicle wheel onto the rack plate, to indicate the presence of a wheel thereon and in one form comprises an arm having a portion extending through the rack plate which, when depressed by movement of the wheel thereover, lifts the arm to a substantially horizontal position laterally of the rack such as to be easily observed by the occupant of the vehicle and in another form comprises a buzzer mounted on one of the legs, an electric cell connected thereto and a contact movable, by movement of the wheel onto the rack plate, to close the circuit through the cell to effect operation of the buzzer. A mechanical snap or click may be substituted for the buzzer. In addition to the traction bar at the lower end of the ramp plate there may be a traction member connected to the lower end of the ramp plate adapted to be placed in a position to be engaged by the front or rear wheel of the vehicle as the rear of front wheel moves onto the ramp to prevent displacement of the ramp.

The invention will now be described in greater detail with reference to the accompanying drawings wherein:

FIG. 3 is a longitudinal section taken on the line 3—3 of FIG. 1;

FIG. 3a is a fragmentary view at the lower end of the ramp plate showing an added traction bar;

FIG. 4 is a fragmentary view of one leg of the structure showing a signalling device mounted thereon;

FIG. 5 is a fragmentary view in elevation showing another form of signalling device;

FIG. 6 is a fragmentary view of FIG. 5;

FIG. 7 is a plan view of the rack, to much smaller scale, showing a traction device for preventing the rack from being displaced as the vehicle wheel moves onto the ramp plate.

Figure 1:
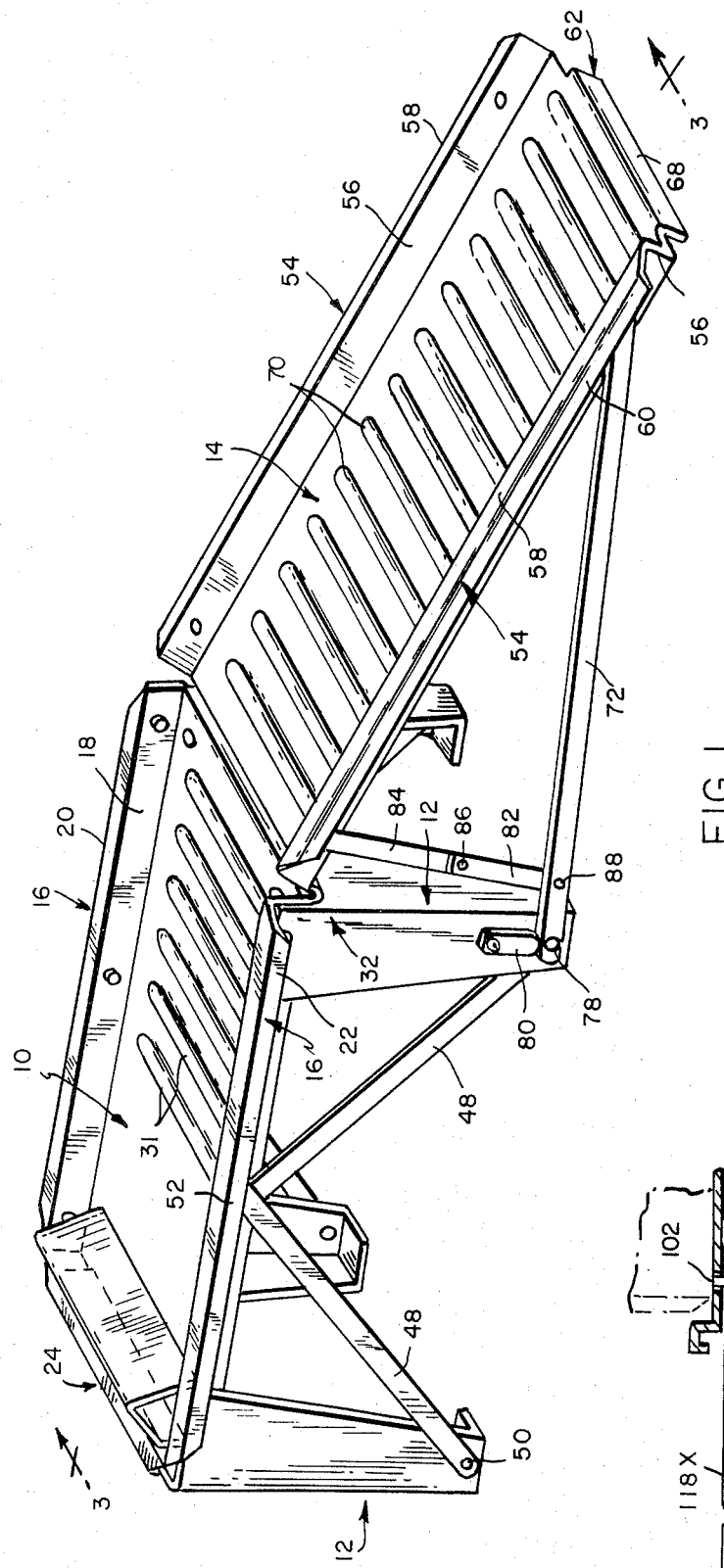
FIG. 1 is a perspective view of the portable vehicle rack of this invention.
Figure 2:
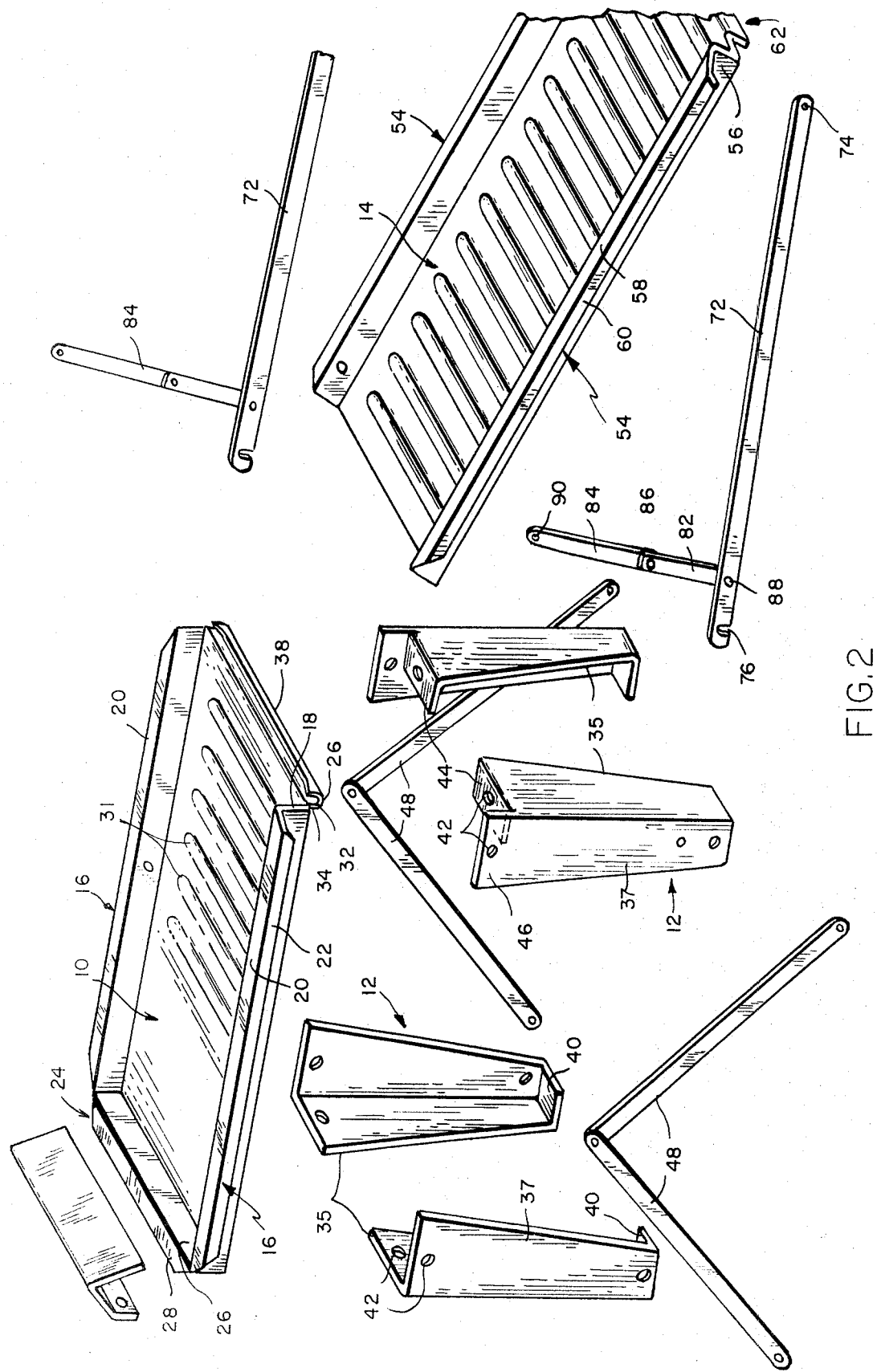
FIG. 2 is a perspective view of the several components making up the portable vehicle rack shown in FIG. 1.

Referring to the drawings (FIGS. 1 and 2), the rack comprises a substantially horizontally disposed rack plate 10 supported at its four corners by leg members 12 and provided at one end with an inclined ramp plate 14, one end of which is detachably connected to one end of the rack plate and the other end of which rests on the floor by means of which the wheel of a vehicle is adapted to be guided upwardly onto the rack plate 10.

The rack plate 10 (FIG. 2) has along its opposite longitudinal edges upwardly extending stiffening members comprising guides 16—16 which are of U-shaped cross-section and downwardly turned, each comprising an upwardly extending inner side wall 18, a horizontally disposed upper wall 20 and a downwardly extending outer wall 22. At one end of the rack plate there is a transversely, upwardly extending stiffening member 24 comprising a stop which is integrally connected at its opposite ends to the longitudinally extending guide member 16—16, which is U-shaped in cross-section, downwardly facing and which comprises an inner, upwardly extending wall 26, a horizontal top wall 28 and a downwardly extending stiffening member 32 comprising a coupling which is U-shaped in cross-section, upwardly facing and which comprises a downwardly extending wall 34, bottom wall 36 and an upwardly extending wall 38.

The rack plate, longitudinal guide members, stop and coupling member are formed out of a single sheet or steel and at the same time there are formed longitudinally of the rack plate at uniformly spaced intervals spaced parallel, upwardly displaced traction ribs 31.

The legs 12 which support the rack plate spaced from the floor are of right angle cross-section comprising side and end plates 35 and 37, the lower edges of which are joined by a web 40. The uppwer ends of the leg plates 35 and 37 at one end of the rack plate abut the undersides of the longitudinal guides and the stop and are secured to the walls 18 and 26, for example, by bolts extending through holes 42 and through holes in the sides 18 and 26. The upper ends of the legs plates 35 and 37 at the other end abut the undersides of the longitudinal guides and the lower side of the rack plate and are secured to the walls 18 and rack plate, for example, by bolts inserted through holes 26 and holes in the sides 18 and the rack plate.

To improve the rigidity of the legs to bending the side and end plates 35 and 37 increase in width from their lower ends toward their upper ends.

To provide for bracing the legs relative to the rack plate and in addition to give support to the rack plate intermediate its ends there are diagonally disposed brace members 48-48 connected at their lower ends by bolts 50 to the lower ends of the legs and at their upper ends by a common bolt 52 to the walls 18 of the guide members.

The ramp 14 like the rack plate has longitudinally disposed stiffening members comprising guides 54—54 along its opposite edges, each of which is U-shaped and comprises an upwardy extending wall 56, a top wall 58 and a dowwnardly extending wall 60. At the opposite ends of the ramp plate there are transversely disposed, downwardly extending, integrally formed stiffening members 62—62, one of which comprises a coupling member and the other a traction member. The stiffening members 62—62 comprise downwardly extending flanges substantially perpendicular to the ramp plate.

The ramp plate, guide members, coupling member and traction member are formed out of a single sheet of steel and at the same time there are formed in the ramp plate spaced parallel, upwardly displaced traction bars 70.

The coupling member 32 at the one end of the rack plate which is upwardly facing and U-shaped in cross section and the stiffening member 62 comprising the coupling member at the one end of the ramp plate which is downwardly turned provide interengageable hooks by means of which the ramp plate may be detachable supported at one end to the one end of the rack plate in an inclined position with the other end resting on the floor.

To prevent accidental displacement of the ramp plate with respect to the rack plate and to facilitate moving the two members as a unit when moving the structure into and out of position, the lower end of the ramp plate is connected to the legs of the rack plate by connecting links 72—72 pivotally connected at one end 74—74 to the lower end of the ramp plate and provided with notches 76—76 at their opposite ends for engagement with studs 78—78 fixed to the lower ends of the legs 12—12. A latch 80 is pivotally mounted on one of the legs above the notched end of the link 72 to prevent it from being accidentally disengaged. Articulated links 82—82, 84—84 are provided to connect the links to the ramp plate, the links being pivotally connected at their adjacent ends by pins 86—86 and at their distal ends by pins 88—88 and 90—90 to the links 72—72 and to the ramp plate respectively.

When driving a vehicle up the ramp onto the rack plate it is difficult without some warning as to the exact position of the wheel to know just when the wheel moves from the ramp onto the rack plate and so there is the danger of overrunning the opposite end of the rack plate and dropping off onto the floor. Accordingly, signal means is provided to indicate the moment that the wheel moves onto the rack plate so that the vehicle may then be brought to a stop before it runs off the other end. In one form the signal means is comprised of a buzzer or bell 92 (FIG. 4) fastened by bolts 94—94 to one of the legs 12 below the rack plate. The buzzer has on it a terminal 96 to which there is fastened the lower end of a tubular housing 98 with the terminal extending through the wall of the housing to the interior thereof. A leaf spring 100 is secured at one end to the underside of the rack plate with its free end above the upper end of the holder 98 and has on its upper side a pin 102 which extends through a hole 104 in the rack plate. A dry cell 106 is mounted in the holder with its lower end engaged with the inwardly extending portion of the terminal and with its upper end situated directly below the free end of the leaf spring. Depression of the leaf spring by engagement of the wheel with the pin 102 will lower the free end of the leaf spring into engagement with the upper end of the dry cell, forcing it downwardly in the housing against the terminal to complete a circuit through the buzzer so as to give a signal. When the buzzer sounds the driver knows that the wheel is on the rack plate and will stop the vehicle just as soon as the buzzer stops by reason of the wheel moving beyond it. Alternatively, the signal device may comprise (FIGS. 5 and 6) an arm 110 pivotally and swingably mounted to the lower end of a bolt 112 fastened to and extending downwardly from the underside of the rack plate. The arm 110 has at one end a bent portion 114 which extends upwardly through a hole 116 in the rack plate and has on its other end a slidably mounted tubular element 118 comprising a flag. The arm normally extends laterally from the side of the rack plate and hangs downwardly at an angle as shown in dotted lines; however, when the vehicle wheel moves onto the rack plate it depresses the bent portion 114, lifting the arm to the horizontal position shown in FIG. 5. The sleeve 118 may be extended along the arm so as to be easily visible from inside the vehicle. To enable storing the arm in an out of the way position it may be swung about the axis of the supporting bolts 112 beneath the rack plate.

Figure 8:
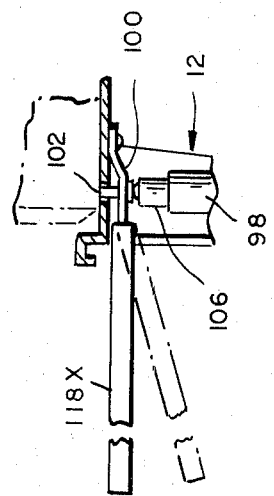
FIG. 8 is an elevation taken at right angles to FIG. 4 showing a modification in which there is combined with the audible signal a visual signal.

A combination audible signal and visual signal may be provided as shown in FIG. 8 by mounting a length of plastic tubing 118x to the end of the leaf spring 100 which by depression actuates the buzzer. The plastic tubing has the advantage that it is flexible and hence will not cause tripping as the arm 110 might if it was not swung around to its out of the way position.

In lieu of the foregoing signal devices a mechanical snap may be placed on the ramp plate adjacent the upper end of the ramp plate to be run over by the wheel and thus caused to produce an audible click.

In order to prevent rolling of the wheel after it is on the ramp plate a wedge member 101 is bolted to the stop 28 and a correspondingly shaped wedge member 103 is placed on the ramp plate behind the wheel but unattached thereto.

There is a tendency for the rack to be displaced away from the vehicle wheel moving into engagement with its lower end particularly if the surface on which the rack is resting is slippery. Such movement may be partially restrained by mounting a friction element in the form of a bar 105 (FIG. 3a) at the lower end of the ramp plate; for example, a channel-shaped bar providing two additionally, transversely disposed, downwardly extending edges 107—107 for engagement with the floor. Preferably a traction device 120 is employed (FIG. 7) comprising a flexible cable 122 connected at one end 124 to the lower end of the ramp plate and a link chain 126 connected to its other end. The cable and chain are of such a length that when the vehicle is moved up to the ramp plate the chain may be positioned so that the front or rear wheel of the vehicle will run over it and be anchored thereby as the rear or front wheel runs up onto the lower end of the ramp plate thus preventing the ramp plate from moving away from the wheel.

The aforesaid portable rack stand as described is exceptionally durable, meets the standards of safety both as to loading capacity and use and is designed for ease of manufacture of its component parts, assembly of the parts and use of the structure.

It should be understood that the present disclosure is for the purpose of illustration only and that this invention includes all modifications and equivalents falling within the scope of the appended claims.

I claim:

1. A portable vehicle rack comprising a horizontally disposed rack plate reinforced by stiffening means at its longitudinal edges comprising guides at the longitudinal edges, support legs at the corners of the rack plate, diagonally disposed braces connecting the lower ends of the legs to the rack plate, an inclined ramp detachably connected at one end to one end of the rack plate and adapted to rest at its other end on the floor, and a signalling device for indicating that a vehicle wheel has reached the ramp plate comprising an arm pivotally supported below the rack plate, said arm having bent portion extending upwardly therefrom through a hole in the ramp plate, said arm in repose being adapted to be disposed at right angles to one of the longitudinal sides of the rack plate with the bent portion extending upwardly through the hole, in which position the arm inclines downwardly from its pivot and being adapted to be raised to a horizontal position by pressure of the wheel on the bent portion of the arm as it moves onto the ramp plate, and a flag on the arm.

2. A portable vehicle rack according to claim 1, wherein a bolt is fixed to the rack plate so as to extend perpendicularly downwardly from the underside thereof to support the arm intermediate its ends, and said arm is suspended thereon for movement angularly about the axis of the bolt to a position beneath the rack plate to dispose it in a stored position.

3. A portable vehicle rack comprising a horizontally disposed rack plate reinforced by stiffening means at its longitudinal edges comprising guides at the opposite longitudinal edges, support legs at the corners of the rack plate, diagonal braces connecting the lower ends of the legs with the rack plate, an inclined ramp detachably connected at one end to one end of the rack plate and adapted to rest at its other end on the floor, and signalling means for indicating that the vehicle wheel has reached the rack plate, comprising an electrically operable audible signal fixed to a leg, said audible signal being provided with a terminal, a hollow holder mounted on the terminal with the terminal extending into the interior thereof, a leaf spring fastened to the underside of the rack plate with an end disposed above the upper open end of the holder and yieldable relative thereto, a pin fastened to the leaf spring extending upwardly through a hole in the rack plate, said pin being adapted to depress the leaf spring downwardly when engaged by a wheel moving onto the rack plate, an electric cell mounted in the holder with one end engaged with the terminal and the other end at a spacing from the spring such that depression of the spring completes the circuit through the audible signal device, and a visual signalling device attached to said leaf spring and movable therewith comprising a plastic tube fixed at one end to the spring and extending laterally therefrom and from the side of the vehicle rack.

4. A portable vehicle rack comprising a horizontally disposed rack plate, upwardly bent flanges at the opposite longitudinal sides and at one end of the rack plate providing flat vertical reinforcing members at opposite sides and along one end of the rack plate, horizontal flanges along the upper edges of the vertical flanges bent outwardly therefrom and vertical flanges along the outer edges of the horizontal flanges bent downwardly therefrom, a depending lip at the other end having a part bent downwardly from the rack plate and then upwardly to provide a transversely extending trough, a ramp plate having at one end a downwardly bent transversely extending flange for engagement within the trough at said other end of the rack plate such that the upper end of the ramp plate is flush with said other end of the rack plate, a traction member at the other end of the ramp plate comprising a downwardly bent transverse flange having a flat edge for frictional engagement with the surface on which the rack rests characterized in that the rack plate is supported in an elevated position by corner posts with longitudinal bracings between the posts at opposite sides but without transverse bracings each post comprising an elongate angle member having integral right angularly disposed outer and inner tapering legs, the right angularly disposed ends of which are joined at their lower ends by webs, said corner posts being disposed at the four corners of the rack plate with the upper edges of the inner and outer legs of the pair of posts at said one end engaged with the undersides of the horizontal flanges along the sides and end and the upper side of the legs portions engaged with the vertical sides of the rack plate and with bolts inserted through the upper side portions of the legs into the vertical sides of the rack plate and wherein the other pair of posts have at the upper ends of the legs at the inner sides inwardly bent over right angularly disposed flanges such that when said posts are disposed at the corners the upper edges of the legs at the outer sides engage with the undersides of the horizontal flanges, the upper portions engage with the vertical sides and the bent over flanges engage with the underside of the rack plate and bolts inserted through the outer legs into the vertical sides and through the bent over flanges into the rack plate.

5. A portable vehicle rack according to claim 4, comprising pins fixed to the lower end of the posts at said other end of the rack plate, rigid links pivotally connected at one end to the lower end of the ramp plate said links being provided with notches at their other ends for engagement with said pins and hinged links connecting the notched ends of the rigid links to the upper end of the ramp plate said hinged links when fully extended holding the notched ends of the rigid links engaged with said pins.

6. A portable vehicle rack comprising a horizontally disposed rack plate reinforced by stiffening means at its longitudinal sides which comprises guides at said sides and at one end by stiffening means which comprises an element of a coupling part, legs at the four corners of the rack plate, means fixing the upper ends of the legs to the rack plate, means supporting the rack plate at its opposite longitudinal sides intermediate its ends comprising diagonally disposed rigid brace members pivotally connected at their upper ends to the longitudinal sides of the rack plate and at their lower ends to the lower ends of the legs, an inclined ramp plate reinforced by stiffening means at its longitudinal sides which comprises guides at said sides and at its ends by stiffening means which comprise at one end an element of a coupling and at the other end a traction bar, the coupling element at the one end of the rack plate comprising a U-shaped upwardly facing gutter extending all the way across the rack plate and the coupling element at the one end of the ramp plate having a downwardly extending flange extending all the way across the ramp plate, said ramp plate being adapted to be supported in an inclined position by engagement of the flange at the one end thereof with the gutter at the one end of the rack plate, linking members connected at one end to the lower end of the ramp plate and at their other ends to the legs and a signaling device for indicating that the vehicle wheels have reached the rack plate, said signaling device comprising a buzzer fixed to a leg, said buzzer being provided with a terminal, a hollow holder mounted on the terminal with the terminal extending into the interior thereof, a leaf spring fastened to the underside of the rack plate with an end disposed above the upper open end of the holder and yieldable relative thereto, a pin fastened to the leaf spring and extending upwardly through a hole in the rack plate, said pin being adapted to depress the leaf spring downwardly when engaged by a wheel moving from the ramp plate onto the rack plate, and an electric cell mounted on the holder with one end engaged with the terminal and the other at a spacing from the spring such that depression of the spring completes the circuit through the buzzer.

7. A portable vehicle rack comprising a horizontally disposed rack plate reinforced by stiffening means at its longitudinal sides which comprise guides at said sides and at one end by stiffening means which comprises an element of a coupling support, legs at the four corners of the rack plate, means fixing the upper ends of the legs to the rack plate, means supporting the rack plate at its opposite longitudinal sides intermediate its ends comprising diagonally disposed rigid brace members pivotally connected at their upper ends to the longitudinal sides of the rack plate and their lower ends to the lower ends of the legs, an inclined ramp plate reinforced by stiffening means at its longitudinal sides which comprise guides at said sides and at its ends by stiffening means which comprise at one end an element of a coupling and the other end a traction bar, the coupling element at the one end of the rack plate comprising a U-shaped, upwardly facing gutter extending all the way across the rack plate and the coupling element at the one end of the ramp plate comprising a downwardly extending flange extending all the way across the ramp plate, said ramp plate being adapted to be supported in an inclined position by engagement of the flange at the one end thereof with the gutter at the one end of the rack plate, linking members connected at one end to the lower end of the ramp plate and at their other ends to the legs and a traction element connected at one end to the lower end of the ramp of such length as to be disposed beneath the wheel at the front or rear end of the vehicle when the rear or front wheel of the vehicle is about to engage with the lower end of the ramp.

8. A portable vehicle rack according to claim 7, wherein the traction element includes a link chain.

9. A portable rack comprising a horizontally disposed rack plate having along its opposite sides and along one end vertical and horizontal bearing surfaces and at its other end a horizontal bearing surface constituted by the underside of the plate at that end, and horizontal bearing surfaces along the sides at the one end extending laterally from the upper edges of the vertical surfaces and four posts secured to the four corners of the rack plate to support the rack plate elevated in a horizontal position each post having right angularly disposed webs comprising downwardly tapering outer and inner legs, the posts at said one end being fastened to the rack plate with the legs paralleling the sides and end engaged respectively with the vertical bearing surfaces and with their upper edges engaged with the horizontal surfaces and the posts at the other end having portions of the inner legs parallel to the end bent downwardly from the portions of the outer legs parallel to the sides and being fastened to the rack plate with the legs parallel to the sides engaged with the vertical bearing surfaces and their upper edges engaged with the horizontal surfaces and with the bent portions of the legs parallel to the end engaged with the horizontal bearing surface at the under side of the rack plate and bolts fastening the respective legs to the bearing surfaces and wherein there is a depending lip at said other end of the rack plate bent downwardly from the bearing surface and then upwardly to provide a transversly depending trough and a ramp plate having at one end a downwardly bent transversly extending flange for engagement within said trough such as to support the one end of the ramp plate at an elevation corresponding to that of the rack plate and with a traction member at the opposite end for engagement of the lower end of the ramp plate with the surface on which the rack rests, a means for detachably holding the ramp plate with the downwardly turned flange engaged within said trough.

* * * * *